Dec. 2, 1969    J. P. FRANCIS    3,481,644
AUTOMOBILE WINDSHIELD WEATHER VISOR
AND SUPPORTING MEANS THEREFOR
Filed April 8, 1968

INVENTOR.
John P. Francis

# United States Patent Office 3,481,644
Patented Dec. 2, 1969

3,481,644
AUTOMOBILE WINDSHIELD WEATHER VISOR AND SUPPORTING MEANS THEREFOR
John P. Francis, 20 Boston St., Haverhill, Mass. 01830
Filed Apr. 8, 1968, Ser. No. 719,776
Int. Cl. B60j 1/20
U.S. Cl. 296—95                                    13 Claims

ABSTRACT OF THE DISCLOSURE

This invention provides weather protection to the windshield area, or any other glass or transparent area of an automobile, when the vehicle is in a parked position. One or more housing members are adapted to removably engage the windshield for supporting engagement thereto. A visor panel supporting member is adjustably supported to the housing member in supporting a removably attached visor panel therefrom. The windshield or other glass areas, on all types of automobiles, are thus capable of being protected from any weather condition.

---

The invention relates to automobile windshield weather visors, and more particularly to a removably attached weather protector adapted for use in the protection of the windshield area, or other glass or transparent areas of the vehicle. Protection is provided from heat developed from the rays of the sun, rain, sleet, snow or ice when the vehicle is parked in a drive-in theatre, or parked in any other type of an outdoor parking area.

A main object of the invention is to provide a novel, and a much improved structural and functional weather protector, which may be made of expendable and inexpensive material so that it may be discarded after one or more uses. This inexpensive form of a weather visor structure may be constructed of material such as waterproof cardboard, or any other paperboard or similar inexpensive sheet material. The material may be treated with a water-repellant substance commonly employed so that the visor panel is somewhat impervious to water or moisture.

A further object of the inventoion is to provide a weather visor panel structure having one or more housing members adapted to be removably attached to any desired location on the windshield area, or at any other selected area or areas of the vehicle. The housing members, in adjustably supporting the visor panel supporting members therefrom with the removably attached weather visor panel, provides the desired windshield weather protection.

With these objects and still others in view, as will hereinafter more fully appear, the invention comprises certain novel constructions, combination and arrangement of parts, hereinafter described and claimed and illustrated in the accompanying drawings, in which:

Referring now more particularly to the drawings, attention is directed primarily to FIGURES 1, 2, 3, 6 and 8 wherein numeral 10 generally indicates the visor panel supporting members. Numeral 11 generally indicates the housing members shown in FIGURES 2, 3, 8, 9 and 10. Numeral 12 generally indicates the visor panel structures, also shown specifically as visor panel structures 25, 26, 27, 28 and 29.

Figure 1:
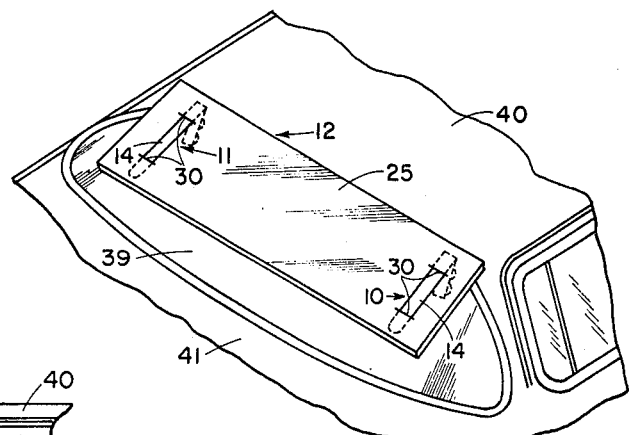
FIGURE 1 is a fragmentary view of an automobile showing one embodiment of the weather visor panel structure, and the supporting means for supporting the visor panel over the roof and the windshield area.

In FIGURE 1, a potrion of an automobile 41 is shown with a weather visor panel 25 made of suitable waterproof material, supported by the laterally spaced apart longitudinally disposed visor panel supporting members 10. The visor panel 25 is shown supported, from and above the windshield area 39, and extending rearwardly over the roof top 40. Each of the visor panel supporting members 10 are supported from a housing member 11 removably attached to the windshield area 39.

Figure 2:
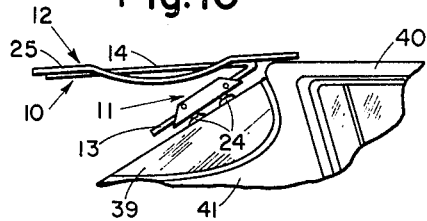
FIGURE 2 is a side elevation view, as in FIGURE 1, showing the rear portion of the visor panel in frictional engagement with the roof top.

FIGURE 2 is a side elevation view of a fully assembled and removably attached device, shown with a rear lateral portion of the visor panel 25 in frictional engagement with the roof top 40. The housing member 11 is shown removably attached, at a selected location on the windshield area 39, by suction cups 24 secured thereto.

Figure 3:
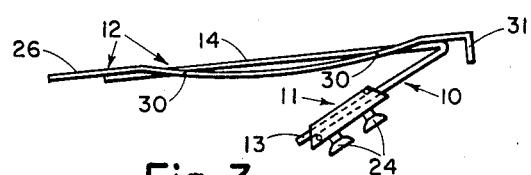
FIGURE 3 is a side elevation view of a modified visor panel having a rear laterally disposed vertical portion. The visor panel is shown supported, in part, above and also below the visor panel supporting member.

FIGURE 3 is a side elevation view of a modified visor panel 26, provided with a rear laterally disposed vertical panel or flap portion 31. The visor panel 26 is slidably engaged to the upper flat portion 14 of the visor panel supporting member 10 upon engaging the longitudinally spaced apart apertures 30 of the said visor panel 26.

The visor panel 12, more specifically visor panels 25, 26, 27 and 28, are formed from bendable or flexible material such as paperboard, or any other suitable material. A set of longitudinally spaced apart apertures 30, with one or more sets adapted to be provided, are formed through the flat surface of the visor panel 12. The visor panel 12 is longitudinally and slidably movable onto the upper flat portion 14 of the visor panel supporting member 10. It is supported, as shown in FIGURES 1, 2, 3 and 4, so that the forward and the rear lateral portions of the visor panel 12 are supported above the said upper flat portion 14 of member 10. Thus, the remaining central lateral portion of visor panel 12 extends below the said upper flat portion 14 of member 10, as shown.

The visor panel 12, more specifically again, visor panels 25, 26, 27 and 28, requires sufficient force to move the visor panel, thus providing a securable and fully taut position until moved manually, due to the method and manner of support. Longitudinal movement of visor panel 12 is provided to extend beyond the extreme rearmost end portion of the visor panel supporting member 10. Rearward movement is thereby limited only when the rear aperture 30 of visor panel 12 abuts the rearmost end portion of the said visor panel supporting member 10.

Figure 9:
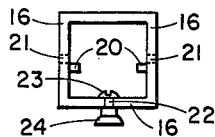
FIGURE 9 is an end elevation of a housing member provided with lateral supporting extensions formed from the opposing side walls.

The longitudinally disposed housing member 11 of FIGURES 2, 3, 8, 9 and 10, is preferably of rectangular shape, provided normally with a bottom, top and side walls 16, or portions thereof. Vertically spaced above the bottom wall 16 are the laterally disposed supporting projections 17 and 18, or projections 20. The projections 17, 18 or 20, are positioned within the housing member 11, as shown in FIGURES 9 an 10.

In FIGURE 9, the laterally disposed supporting projections 20 are formed from the opposing side walls 16, with suitable side portions thereof bent inwardly and laterally to form the supports 20. An opening 21 is thus formed in the opposing side walls 16 of the housing member 11.

Figure 10:
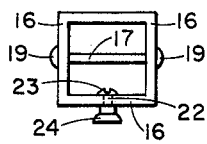
FIGURE 10 is an end elevation view of another form of a housing member having a laterally disposed rod like supporting member.

In FIGURE 10, the laterally disposed supporting projection 17, which is positioned at the forward end of the housing member 11, is formed from a laterally disposed rod like member 17 or other suitable means, and provided with enlarged end securing portions 19. Any suitable number of laterally disposed supporting projections 20, or 17 and 18 FIGURE 8, may be employed to provide support for the various angular, vertical and longitudinal supporting positions of the removably attached visor panel supporting member 10.

Referring back to FIGURES 9 an 10, the housing member 11 is provided with apertures 22 formed in the bottom wall portion 16. Securing means in the form of bolts 23, or other suitable means engages the suction cups 24 to the under side of the housing member 11.

Removably and adjustably engaged and supported within the housing member 11 is a visor panel supporting member 10, FIGURES 2, 3 an 8. The preferably flat visor panel supporting member 10 is formed with an upper, visor panel engaging, and forwardly extending flat portion 14, and a forwardly bent lower, housing engaging, flat portion 13. Lower flat portion 13 extends in a dissimilar and at a greater downward angle than the upper flat portion 14.

Figure 4:
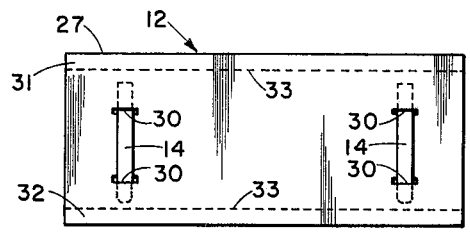
FIGURE 4 is a top plan view of another modified visor panel structure, provided with forward and rear laterally disposed vertically bendable portions.

In FIGURE 4, the modified visor panel 27 is provided with longitudinally spaced apart laterally disposed score or crease lines 33. The rear 31 and the forward 32 laterally disposed portions, when bent downwardly at crease lines 33, are adapted to form forward and rear vertical panels. The upper flat portion 14 of the visor panel supporting member 10 is shown extending and engaging the flat sheet of the visor panel 27, partially below, and partially above the said flat sheet. The visor panel 27 may be constructed of material such as corrugated paperboard, or other suitable material, sufficiently flexible to removably engage the visor panel supporting member 10 in the manner described, and shown in the drawings.

Figure 5:
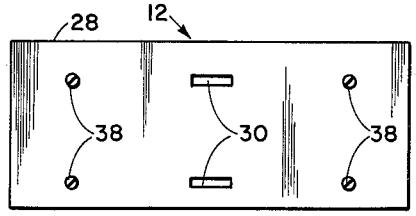
FIGURE 5 is a top plan view of a visor panel provided with centrally located apertures and optional visor panel securing means.

Another modified visor panel 28, FIGURE 5, is also provided with the longitudinally spaced apart apertures 30. Also shown are the securing means 38, in the form of a screw member, which are optional, for removably securing the visor panel 28 as shown in FIGURE 8.

Figure 7:
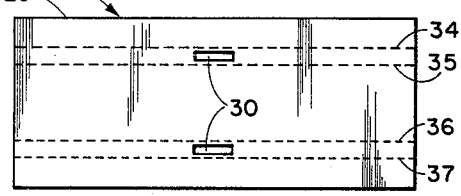
FIGURE 7 is a top plan view of the visor panel structure of FIGURE 6 showing the apertures and the score or crease lines.

In FIGURE 7, there is shown in a top plan view another modified form of a visor panel 12. The substantially rectangular shaped flat visor panel 29 is constructed of corrugated paperboard, or similar inexpensive and bendable sheet material. Flat sheet 29 is provided with a set of two forwardly positioned laterally disposed, and longitudinally spaced apart score or crease lines 36 and 37. An aperture 30 is formed between the crease lines 36 and 37. An additional set of two, rearwardly positioned, laterally disposed and longitudinally spaced apart crease lines 34 and 35 are also provided. An aperture 30 is formed between the crease lines 34 and 35.

Figure 6:
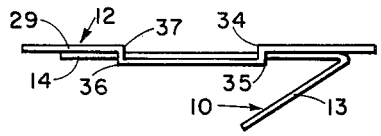
FIGURE 6 is a side elevation view of another form of a modified visor panel structure. The visor panel is shown having upper longitudinally spaced apart flat portions, and a connecting lower flat portion.

In FIGURE 6, there is shown the fully bent preshaped visor panel 29 formed from the flat sheet, shown in FIGURE 7. Visor panel 29 is shaped with a forward upper flat portion, a forward vertically disposed panel portion at 36 and 37, a lower central flat portion, a rear vertically disposed panel portion at 34 and 35, and a rear upper flat portion. The central flat portion, between bent portions 35 and 36, may be of any any suitable longitudinal width to provide for the support and maximum rearward sliding engagement of the visor panel 29.

Figure 8:
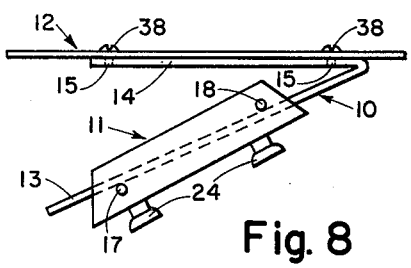
FIGURE 8 is a side elevation view of the housing member, the attached visor panel supporting member, and the removably attached visor panel.

Referring to FIGURE 8, a housing member 11 is shown with the lower flat portion 13 of visor panel supporting member 10 engaged below the rear laterally disposed supporting projection 18. The forward end of the lower flat portion 13 may be positioned, as shown, above the forward laterally disposed supporting projection 17 to provide an angular supporting position for member 10. It is quite obvious that lower flat portion 13 may be employed in various other positions for adjustable supporting engagement. Visor panel 12 is shown removably attached by the visor securing means 38, which are engaged in the apertures 15 of the supporting member 10.

The visor panel supporting means comprises, in general, the visor panel supporting members 10, removably and adjustably supported within the housing members 11. The suction cups 24 are attached to the windshield area 39, at the selected height and at the selected lateral location, in supporting one or more housing members 11 to the windshield area 39. It is to be noted that the visor panel supporting member 10 may be employed and retained in any selected longitudinal position. This is the result of a snug frictional engagement of lower flat portion 13 within the housing member 11.

It is quite obvious that visor panel 12 may be adjustably positioned for any forward or extended rearward movement. In addition, the visor panel 12 is also adapted to be adjustably positioned angularly, with or without, any longitudinal movement. Also, visor panel 12 is vertically positionable, depending upon the selected engagement of the visor panel supporting member 10, when positioned above or below the supporting projections 17 and 18, or 20, of housing member 11. Due to the partial and the adjustable movable rearward overhang of visor panel 12 and the visor panel supporting member 10, stress is reduced to prevent any possible collapse of vacuum from any of the suction cups 24. Stress is reduced, without the addition of any moisture or other application to the suction cups 24, when removably attached onto the windshield area 39.

Referring back to FIGURE 2, it is to be noted that visor panel 12, more specifically visor panel 25, is adapted to adjustably engage the roof top 40. The rear lateral flat portion of visor panel 25, supported on the forwardly extending upper flat portion 14 of member 10, engages or disengages the roof top 40. This can be accomplished upon the movement of the downwardly angled lower flat portion 13 of member 10, through the housing member 11.

In the construction of the visor panel 12, any other suitable material such as Masonite, sheet metal or plastic material may be used. The type of material selected depending upon the use of, purpose and whether employed as a disposable item.

In the use of the device, on a majority of motor vehicles, the windshield wipers can be used when desired. This depends upon the location and the clearance of the attached housing member or members 11, or the suction cups 24, on the windshield area 39.

An important feature of the device is that all types of motor vehicles may be fully protected for vision, since the visor panel supporting means are removably attached to the windshield area. Other glass or transparent areas of the vehicle may also be protected for vision, or employed for protection against the weather when the window area is lowered or opened. Thus convertibles, such as automobiles having a flexible or fabric covered roof top can be fully protected, due to the attached location of the visor panel supporting means.

It is quite obvious that the housing member may be removably attached on a selected flat surface area of the roof top. The straight end portion of the visor panel supporting member such as in FIGURE 6, may be supported from a housing member. The suction cups may be permanently attached to the vehicle by adhesives or other suitable securing means.

While certain embodiments of my invention have been disclosed in the foregoing description, it will be understood that various modifications may occur to those skilled in the art.

I claim:

1. Automobile windshield weather visor supporting means for adjustably supporting a removably attached windshield weather visor panel, comprising a longitudinally disposed housing member adapted to be angularly positioned, said housing member having at least two laterally disposed supporting projections extending inwardly from the side portions and spaced above the bottom portion of the said housing member, an adjustably supported visor panel supporting member formed with a longitudinally disposed flat upper portion and a vertically spaced and angled flat lower portion extending forwardly and downwardly from the rearmost end portion of said flat upper portion, said flat lower portion frictionally engaging the said laterally disposed supporting projections of the said angularly positioned housing member to provide the selected supporting position of said visor panel supporting member, said flat upper portion engaging and supporting the said removably attached visor panel thereto, windshield engaging means removably attached to a preselected vertical and lateral supporting position on the windshield area and attached by securing means to the under surface of the bottom portion of said housing member, said flat upper portion adjustably supporting the said attached visor panel so that the rear lateral portion of said visor panel is adapted to frictionally engage the lateral portion of the roof top in rain sealing engagement therewith or adapted to be supported in vertically spaced apart relationship depending upon the selected movable supporting position of the said visor panel supporting member in lowering or raising the position of the said longitudinally disposed flat upper portion thereof whereby the said attached visor panel is adapted to engage or disengage the roof top.

2. Automobile windshield weather visor supporting means for adjustably supporting a removably attached windshield weather visor panel, comprising laterally spaced apart and longitudinally disposed housing members adapted to be angularly positioned, each of said housing members having at least two laterally disposed supporting projections extending inwardly from the side portions and spaced above the bottom portion of each of the said housing members, each of the said housing members adjustably supporting a visor panel supporting member formed with a longitudinally disposed upper portion and a vertically spaced and angled lower portion extending forwardly and downwardly from the rearmost end portion of said upper portion, each of the said lower portions frictionally engaging the said laterally disposed supporting projections of each of the said angularly positioned housing members to provide the selected supporting position of each of the said visor panel supporting members, said upper portion of each of the said supporting members engaging and supporting the said removably attached visor panel thereto, windshield engaging means removably attached to a preselected vertical and lateral supporting position on the windshield area and attached by securing means to the under surface of the bottom portion of each of the said housing members, said upper portion of each of the said visor panel supporting members adjustably supporting the said attached visor panel so that the rear lateral portion of said visor panel is adapted to frictionally engage the lateral portion of the roof top in rain sealing engagement therewith or adapted to be supported in vertically spaced apart relationship depending upon the selected movable supporting position of the said visor panel supporting members in lowering or raising the position of the said longitudinally disposed upper portions thereof whereby the said attached visor panel is adapted to engage or disengage the roof top.

3. Automobile windshield weather visor supporting means for adjustably supporting a removably attached windshield weather visor panel, comprising a longitudinally disposed housing member adapted to be angularly positioned, said housing member having therein at least one laterally disposed supporting projection spaced above the bottom portion of the said housing member, an adjustably supported visor panel supporting member formed with a longitudinally disposed flat upper portion and a vertically spaced and angled flat lower portion extending forwardly and downwardly from the rearmost end portion of said flat upper portion, said flat lower portion frictionally engaging the said laterally disposed supporting projection of the said housing member to provide the selected supporting position of said visor panel supporting member, said flat upper portion engaging and supporting the said removably attached visor panel thereto, windshield engaging means removably attached to a preselected vertical and lateral supporting position on the windshield area and attached by securing means to the under surface of the bottom portion of said housing member, said flat upper portion adjustably supporting the said attached visor panel so that the rear lateral portion of said visor panel is adapted to frictionally engage the lateral portion of the roof top in rain sealing engagement therewith or adapted to be supported in vertically spaced apart relationship depending upon the selected movable supporting position of the said visor panel supporting member in lowering or raising or changing the angular supporting position of the said longitudinally disposed flat upper portion thereof whereby the said attached visor panel is adapted to engage or disengage the roof top.

4. Automobile windshield weather visor supporting means for adjustably supporting a removably attached windshield weather visor panel, comprising laterally spaced apart and longitudinally disposed housing members adapted to be angularly positioned, each of the said housing members having therein at least one laterally disposed supporting projection spaced above the bottom portion of the said housing members, each of the said housing members adjustably supporting a visor panel supporting member formed with a longitudinally disposed flat upper portion and a vertically spaced and angled flat lower portion extending forwardly and downwardly from the rearmost end portion of said flat upper portion, each of the said flat lower portions frictionally engaging the said laterally disposed supporting projection of each of the said housing members to provide the selected supporting position of each of the said visor panel supporting members, said flat upper portion of each of the said supporting members engaging and supporting the said removably attached visor panel thereto, windshield engaging means removably attached to a preselected vertical and lateral supporting position on the windshield area and attached by securing means to the under surface of the bottom portion of each of the said housing members, said flat upper portion of each of the said visor panel supporting members adjustably supporting the said attached visor panel so that the rear lateral portion of said visor panel is adapted to frictionally engage the lateral portion of the roof top in rain sealing engagement therewith or adapted to be supported in vertically spaced apart relationship depending upon the selected movable supporting position of the said visor panel supporting members in lowering or raising or changing the angular supporting position of the said longitudinally disposed flat upper portions thereof whereby the said attached visor panel is adapted to engage or disengage the roof top.

5. Automobile windshield weather visor supporting means for adjustably supporting a removably attached windshield weather visor panel, comprising a longitudinally disposed housing member adapted to be angularly positioned, said housing member having therein longitudinally spaced apart laterally disposed supporting projections spaced above the bottom portion of the said housing member, an adjustably supported visor panel supporting member formed with a longitudinally disposed flat upper portion and a vertically spaced and angled flat lower portion extending forwardly and downwardly from the rearmost end portion of said flat upper portion, said flat lower portion frictionally engaging the selected said laterally disposed supporting projections of the said housing member to provide the selected supporting position of said visor panel supporting member, said flat upper portion engaging and supporting the said removably attached visor panel thereto, windshield engaging means removably attached to a preselected vertical and lateral supporting position on the windshield area and attached by securing means to the under surface of the bottom portion of said housing member, said flat upper portion adjustably supporting the said attached visor panel so that the rear lateral portion of said visor panel is adapted to frictionally engage the lateral portion of the roof top in rain sealing engagement therewith or adapted to be supported in vertically spaced apart relationship depending upon the selected movable supporting position of the said visor panel supporting member in lowering or raising or changing the angular supporting position of the said longitudinally disposed flat upper portion thereof whereby the said attached visor panel is adapted to engage or disengage the roof top.

6. Automobile windshield weather visor supporting means for adjustably supporting a removably attached windshield weather visor panel, comprising laterally spaced apart and longitudinally disposed housing members adapted to be angularly positioned, each of the said housing members having therein longitudinally spaced apart laterally disposed supporting projections spaced above the bottom portion of the said housing members, each of the said housing members adjustably supporting a visor panel supporting member formed with a longitudinally disposed flat upper portion and a vertically spaced and angled flat lower portion extending forwardly and downwardly from the rearmost end portion of said flat upper portion, each of the said flat lower portions frictionally engaging the selected said laterally disposed supporting projections of each of the said housing members to provide the selected supporting position of each of the said visor panel supporting members, said flat upper portion of each of the said supporting members engaging and supporting the said removably attached visor panel thereto, windshield engaging means removably attached to a preselected vertical and lateral supporting position on the windshield area and attached by securing means to the under surface of the bottom portion of each of the said housing members, said flat upper portion of each of the said visor panel supporting members adjustably supporting the said attached visor panel so that the rear lateral portion of said visor panel is adapted to frictionally engage the lateral portion of the roof top in rain sealing engagement therewith or adapted to be supported in vertically spaced apart relationship depending upon the selected movable supporting position of the said visor panel supporting members in lowering or raising or changing the angular supporting position of the said longitudinally disposed flat upper portions thereof whereby the said attached visor panel is adapted to engage or disengage the roof top.

7. Supporting means for adjustably supporting a removably attached automobile windshield weather visor panel, comprising a longitudinally disposed housing member, said housing member having therein at least one laterally disposed supporting projection spaced between the upper portion and the bottom portion of said housing member, a removably attached visor panel supporting member frictionally engaging the said laterally disposed supporting projection of said housing member to provide the selected supporting position of said visor panel supporting member, said visor panel supporting member having a forwardly extending longitudinally disposed upper portion adapted to support a removably attached visor panel thereto, the rear lateral portion of said visor panel adapted to engage or disengage the roof top depending upon the supporting position of said upper portion of the said movable visor panel supporting member, and the said housing member adapted to removably engage windshield engaging means thereto for the support of said housing member.

8. Automobile windshield weather visor supporting means for supporting an adjustably supported removably attached windshield weather visor panel, comprising a longitudinally disposed housing member, a removably attached visor panel supporting member supported from the said housing member, a movably supported visor panel having horizontally flat longitudinally spaced apart apertures through the flat surface thereof and provided at a substantial distance rearwardly of the said apertures with a rear laterally disposed vertical panel portion, said visor panel supporting member slidably engaging the said horizontally flat apertures of said visor panel upon extending below a portion of the said visor panel in engaging the said flat rearmost aperture and extending forwardly and thence above a portion of the said visor panel in engaging the said flat forward aperture and thence extending below a portion of the said visor panel forwardly of the said engaged flat forward aperture in frictionally engaging the said underside and also a portion of the said upper surface of said visor panel for the longitudinally movable and the extended rearward movement of the said visor panel in extending rearwardly of the extreme rearmost end portion of said visor panel supporting member, said rear laterally disposed vertical panel portion of said visor panel adapted to frictionally engage the lateral portion of the roof top in rain sealing engagement therewith or adapted to be supported in spaced apart relationship depending upon the selected longitudinally movable supporting position of said visor panel whereby the said vertical panel portion is adapted to engage or disengage the roof top, and means adapted to removably engage the said housing member to a selected area on the automobile such as the windshield or roof top area.

9. Automobile windshield weather visor supporting means for supporting an adjustably supported removably attached windshield weather visor panel, comprising a longitudinally disposed housing member adapted to be angularly positioned, a removably attached visor panel supporting member slidably supported through the said angularly positioned housing member to provide the selected supporting position of said visor panel supporting member, said visor panel supporting member being provided with a forwardly extending longitudinally disposed flat upper portion, a movably supported visor panel having horizontally flat longitudinally spaced apart apertures through the flat surface thereof at a substantial distance from both the forward and the rear lateral portions of said visor panel, said flat upper portion of said supporting member slidably engaging the said horizontally flat apertures of said visor panel upon extending below a portion of the said visor panel in engaging the said flat rearmost aperture and extending forwardly and thence above a portion of the said visor panel in engaging the said flat forward aperture and thence extending below a portion of the said visor panel forwardly of the said engaged flat forward aperture in frictionally engaging the said underside and also a portion of the said upper surface of said visor panel for the longitudinally movable and the extended rearward movement of the said visor panel in extending rearwardly of the extreme rearmost end portion of said flat upper portion, the said rear lateral portion of said visor panel adapted to frictionally engage the lateral portion of the roof top in rain sealing engagement therewith or adapted to be supported in spaced apart relationship depending upon the selected longitudinally movable supporting position of said visor panel whereby the said movable visor panel is adapted to engage or disengage the roof top, and windshield engaging means removably attached to a preselected vertical and lateral supporting position on the windshield area and attached by securing means to the under surface of the bottom portion of said housing member.

10. Automobile windshield weather visor supporting means for supporting an adjustably supported removably attached windshield weather visor panel, comprising laterally spaced apart and longitudinally disposed housing members adapted to be angularly positioned, removably attached visor panel supporting members slidably supported through the said angularly positioned housing members to provide the selected supporting position of said visor panel supporting members, each of the said visor panel supporting members being provided with a forwardly extending longitudinally disposed flat upper portion, a movably supported visor panel having horizontally flat longitudinally and laterally spaced apart apertures through the flat surface thereof at a substantial distance from both the forward and the rear lateral portions of said visor panel, said flat upper portion of each of the said supporting members slidably engaging the said horizontally flat apertures of said visor panel upon extending below a portion of the said visor panel in engaging the said flat rearmost apertures and extending forwardly and thence above a portion of the said visor panel in engaging the said flat forward apertures and thence extending below a portion of the said visor panel forwardly of the said engaged flat forward apertures in frictionally engaging the said underside and also a portion of the said upper surface of said visor panel for the longitudinally movable and the extended rearward movement of the said visor panel in extending rearwardly of the extreme rearmost end portion of said flat upper portion, the said rear lateral portion of said visor panel adapted to frictionally engage the lateral portion of the roof top in rain sealing engagement therewith or adapted to be supported in spaced apart relationship depending upon the selected longitudinally movable supporting position of said visor panel whereby the said movable visor panel is adapted to engage or disengage the roof top, and windshield engaging means removably attached to a preselected vertical and lateral supporting position on the windshield area and attached by securing means to the under surface of the bottom portion of each of the said housing members.

11. Automobile windshield weather visor supporting means for supporting an adjustably supported removably attached windshield weather visor panel, comprising a longitudinally disposed housing member adapted to be angularly positioned, a removably attached visor panel supporting member slidably engaging the said angularly positioned housing member to provide the selected supporting position of said visor panel supporting member, said visor panel supporting member being provided with a forwardly extending longitudinally disposed upper portion, a movably supported visor panel having longitudinally spaced apart laterally disposed vertical portions extending above the lower flat body portion of said visor panel and provided further with horizontally disposed upper flat portions extending forwardly from the said forward vertical portion and extending rearwardly from the said rear vertical portion, at least one aperture being provided in each of the said upwardly extending vertical portions, said upper portion of said supporting member slidably engaging the said apertures of said vertical portions upon extending below the said upper rear flat portion of the said visor panel in engaging the said aperture of said rear laterally disposed vertical portion and extending forwardly and thence above a portion of the said lower flat body portion of said visor panel in engaging the said aperture of said forward laterally disposed vertical portion and thence extending below a portion of the said upper forward flat potrion of the said visor panel forwardly of the said engaged forward aperture for the longitudinally movable and the extended rearward movement of the said visor panel in extending rearwardly of the extreme rearmost end portion of said upper portion, the rear lateral portion of said visor panel adapted to frictionally engage the lateral portion of the roof top in rain sealing engagement therewith or adapted to be supported in spaced apart relationship depending upon the selected longitudinally movable supporting position of said visor panel whereby the said movable visor panel is adapted to engage or disengage the roof top, and windshield engaging means removably attached to a preselected vertical and lateral supporting position on the windshield area and attached by securing means to the under surface of the bottom portion of said housing member.

12. A windshield weather visor panel comprising, a generally rectangular flat sheet of relatively stiff paperboard or other relatively stiff yet somewhat yieldable material supported as a weather visor panel for the windshield of a motor vehicle, said flat sheet having at least one set of longitudinally spaced apart apertures, said apertures being formed a substantial distance from both the forward and the rear laterally disposed edges of said flat sheet, said flat visor panel being slidably engageable and movably supported onto a longitudinally disposed visor panel supporting member, said visor panel supporting member extending below a portion of the said flat visor panel in engaging the said rearmost aperture and thence extending forwardly and above a portion of the said flat visor panel in engaging the said forward aperture and thence extending below a portion of the said flat visor panel forwardly of the said engaged forward aperture for the longitudinally movable and the extended forward or rearward movement of the said flat visor panel, a housing member adapted to support the said visor panel supporting member therefrom, and means adapted to removably engage the said housing member to a selected area on the motor vehicle such as the windshield or roof top area.

13. A windshield weather visor panel comprising, a generally rectangular flat sheet of relatively stiff paperboard or other bendable material which can be folded and pre-shaped into a weather visor for the windshield of a motor vehicle, said flat sheet having a set of laterally disposed first and second crease lines longitudinally spaced apart in said order rearwardly of the forward lateral edge of said flat sheet, at least one aperture formed between the said first and second crease lines, an additional set of laterally disposed first and second crease lines longitudinally spaced apart in said order forwardly of the rear lateral edge of said flat sheet, at least one aperture formed between the said additional first and second crease lines, the bendable portions of said flat sheet at both of the said second crease lines bendable upwardly to form longitudinally spaced apart upwardly extending vertical portions, the bendable portions at both of the said first crease lines bendable outwardly and downwardly to a horizontal position from the said bent upwardly extending vertical portions, said last bent portions being horizontally positioned and longitudinally spaced apart and above the said lower horizontally positioned flat portion to form the said pre-shaped visor having at least three horizontal portions and two vertical portions, said pre-shaped visor being slidably and movably supported onto a longitudinally disposed visor support upon engaging the said apertures of the said bent longitudinally spaced apart upwardly extending vertical portions of the said visor panel.

References Cited

UNITED STATES PATENTS

| | | | |
|---|---|---|---|
| 1,263,323 | 4/1918 | Kaempf. | |
| 2,972,377 | 2/1961 | Jacobs. | |
| 3,297,356 | 1/1967 | Francis | 296—95 |
| 3,348,875 | 10/1967 | Francis | 296—95 |
| 3,400,750 | 9/1968 | Smarker | 296—95 X |

LEO FRIAGLIA, Primary Examiner

J. A. PEKAR, Assistant Examiner

U.S. Cl. X.R.

160—368